United States Patent
Bowman et al.

(10) Patent No.: US 12,238,430 B2
(45) Date of Patent: Feb. 25, 2025

(54) CAMERA SYSTEM FOR CAPTURING THREE DIMENSIONAL IMAGES

(71) Applicant: Vasis Medical, LLC, Mission Viejo, CA (US)

(72) Inventors: Heath C. Bowman, Mission Viejo, CA (US); Charles V. Bowman, Mission Viejo, CA (US)

(73) Assignee: Vasis Medical, LLC, Mission Viejo, CA (US)

( * ) Notice: Subject to any disclaimer, the term of this patent is extended or adjusted under 35 U.S.C. 154(b) by 0 days.

(21) Appl. No.: 18/648,119

(22) Filed: Apr. 26, 2024

(65) Prior Publication Data

US 2024/0305902 A1    Sep. 12, 2024

Related U.S. Application Data

(63) Continuation of application No. 18/537,208, filed on Dec. 12, 2023, now Pat. No. 11,974,051.

(60) Provisional application No. 63/431,814, filed on Dec. 12, 2022.

(51) Int. Cl.
*H04N 23/90* (2023.01)
*G06T 17/00* (2006.01)
*H04N 5/262* (2006.01)
*H04N 23/695* (2023.01)

(52) U.S. Cl.
CPC ............. *H04N 23/90* (2023.01); *G06T 17/00* (2013.01); *H04N 5/2624* (2013.01); *H04N 23/695* (2023.01)

(58) Field of Classification Search
None
See application file for complete search history.

(56) References Cited

U.S. PATENT DOCUMENTS

| | | | |
|---|---|---|---|
| 10,122,997 B1 * | 11/2018 | Sheffield | H04N 13/296 |
| 10,386,184 B2 * | 8/2019 | Hart | G01C 11/06 |
| 10,839,557 B1 * | 11/2020 | Arora | G06T 19/006 |
| 2016/0313263 A1 * | 10/2016 | Featonby | G01N 23/046 |
| 2018/0247393 A1 * | 8/2018 | Ohga | H04N 23/698 |
| 2019/0364207 A1 | 11/2019 | Yang | |
| 2021/0101414 A1 * | 4/2021 | Zoken | G06T 7/0006 |
| 2022/0327766 A1 | 10/2022 | Scheich | |

* cited by examiner

*Primary Examiner* — Edemio Navas, Jr.
(74) *Attorney, Agent, or Firm* — Crockett & Crockett, PC; K. David Crockett, Esq.

(57) ABSTRACT

Systems and methods described below provide for rapid imaging of an object and reconstruction of a 3D image of the object. The imaging system is configured to obtain numerous images of an object from many angles around the object. The imaging system includes a camera rig which supports several cameras, with the viewing angle of each camera directed to the object. The camera rig is rotatable about the object, or vice-versa, in order to obtain images around the entirety of the object. The location of each camera is used by an imaging processing system to match adjacent images to be stitched together, avoiding the need to compare edges of a number of images to match an image to an adjacent image.

1 Claim, 6 Drawing Sheets

CAMERA SYSTEM FOR CAPTURING THREE DIMENSIONAL IMAGES

This application is a continuation of U.S. application Ser. No. 18/537,208, filed Dec. 12, 2023, now U.S. Pat. No. 11,974,051, which claims priority to U.S. Provisional Application 63/431,814, filed Dec. 12, 2022.

FIELD OF THE INVENTIONS

The inventions described below relate to the field of three dimensional imaging.

BACKGROUND

Three-dimensional image reconstruction of an object is accomplished using multiple images to create three-dimensional models from a set of two-dimensional images of the object obtained from one camera or an array of several cameras. When using several cameras to obtain the images, the cameras may be positioned on a rig surrounding the object. Georgis, et al., Programmable Rig Control For Three-Dimensional (3d) Reconstruction, US Pub. 2022/0116531 (Apr. 14, 2022) discloses an example of such a system, and includes a hemispherical rig, sized to surround actors on a movie set, to obtain a 3D video of the actors and create a video that can be viewed from any angle of the movie scene. The various cameras have fields of view that may encompass cameras and light sources on the opposite side of the rig. For 3D imaging and reconstruction, a camera rig operable to obtain images from all points surrounding the object to be imaged, without other cameras appearing in the field of view and the field of illumination of the lights of the system do not directly encompass cameras in the rig, will facilitate imaging and 3D reconstruction.

SUMMARY

The systems and methods described below provide for rapid imaging of an object and reconstruction of a 3D image of the object. The imaging system is configured to obtain numerous images of an object from many angles around the object. The imaging system includes a camera rig which supports several cameras, with the viewing angle of each camera directed to the object. The camera rig is rotatable about the object, in order to obtain images around the entirety of the object. The location of each camera is used by an imaging processing system to match adjacent images to be stitched together, avoiding the need to compare edges of a number of images to match an image to an adjacent image. The array is configured such that the cameras and lights in the rig are operable to obtain images from all points surrounding the object to be imaged, without other cameras appearing in the field of view. The field of illumination of the lights of the system do not directly encompass cameras in the rig, which will facilitate imaging and 3D reconstruction.

BRIEF DESCRIPTION

Figure 3:
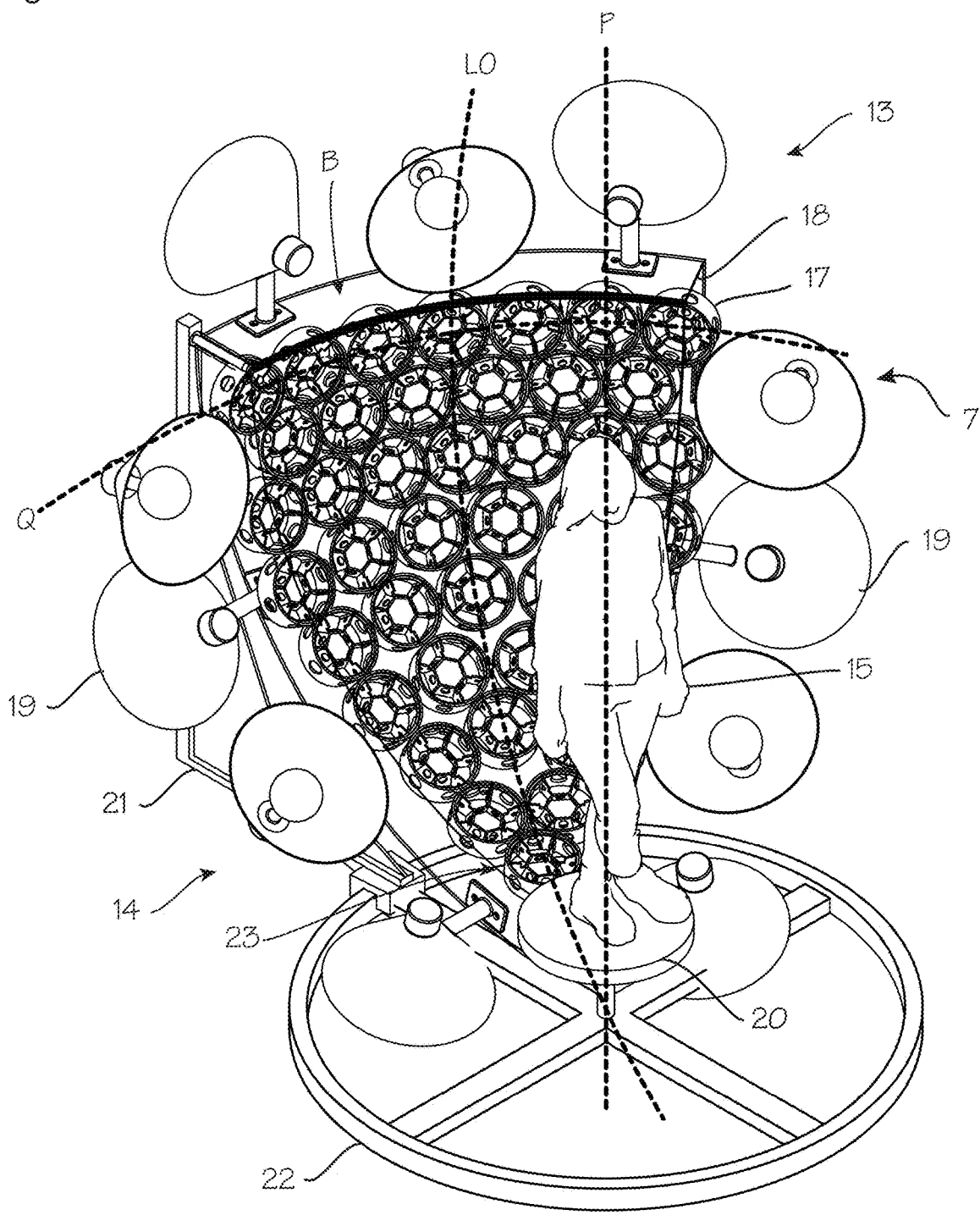
FIG. 3 illustrates a 3D imaging system with a camera rig for obtaining numerous images (photographs or video frames) of a subject object placed on a support within view of numerous cameras fixed on the rig.
Figure 4:
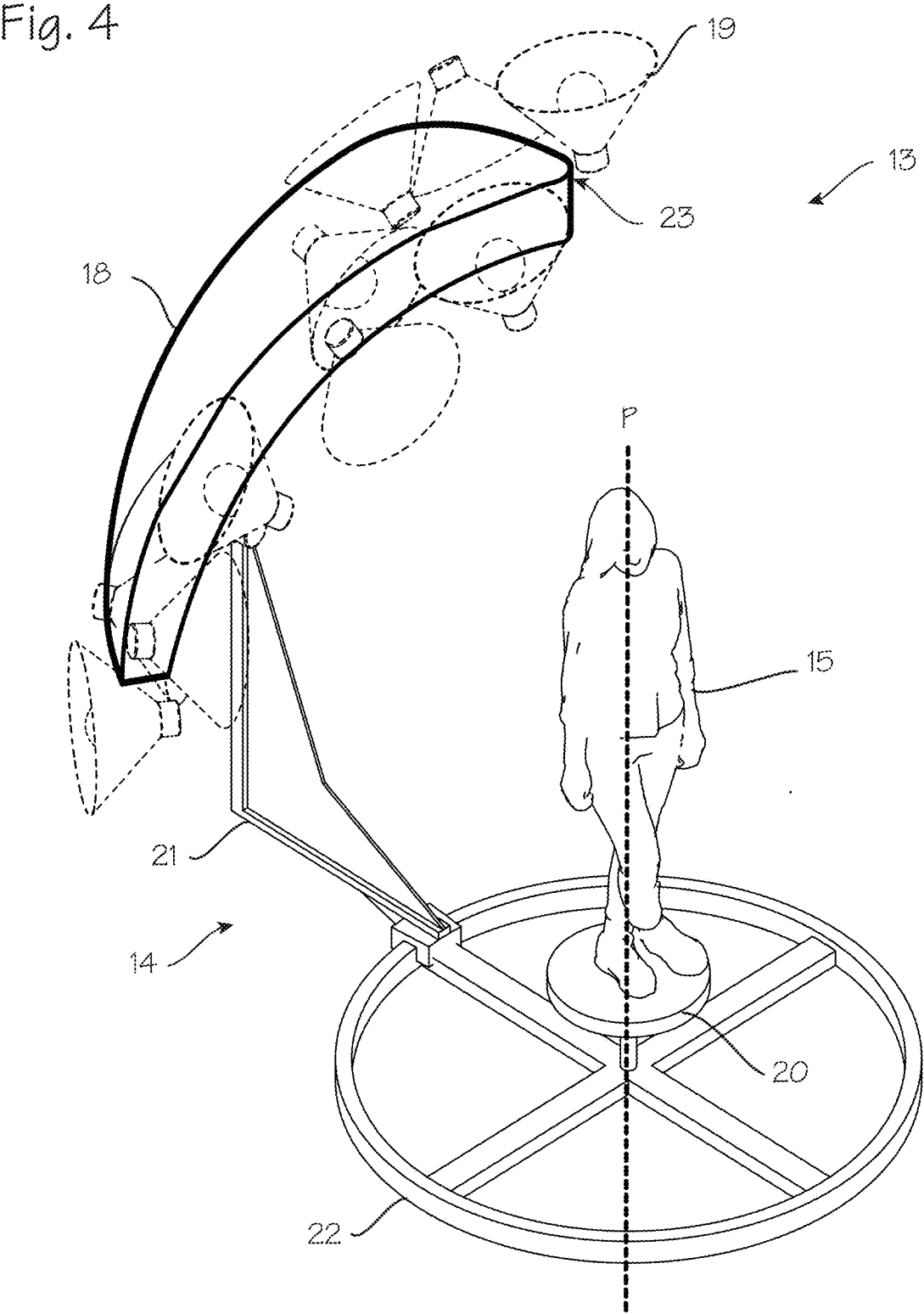
FIG. 4 illustrates the 3D imaging systems with the camera support structure of the camera rig of FIG. 1 in a second positions relative to the subject object.
Figure 6:
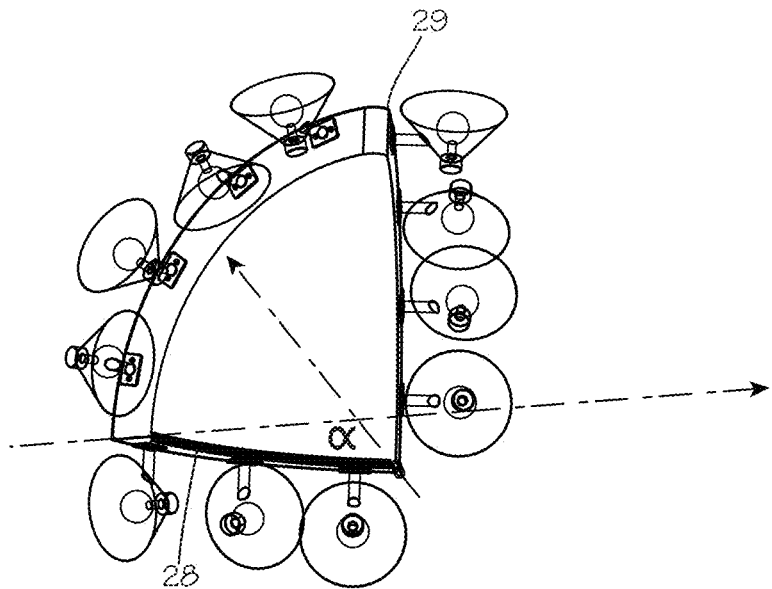
Figure 7:
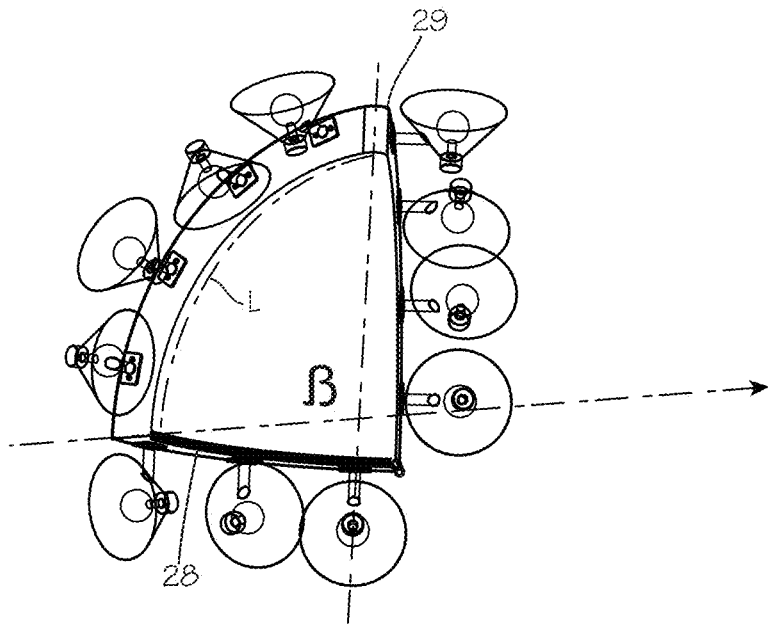

FIGS. 6 and 7 provide additional views of the camera support structure of FIGS. 3 and 4 to illustrate characteristics which facilitate imaging.

DETAILED DESCRIPTION OF THE INVENTIONS

Figure 1:
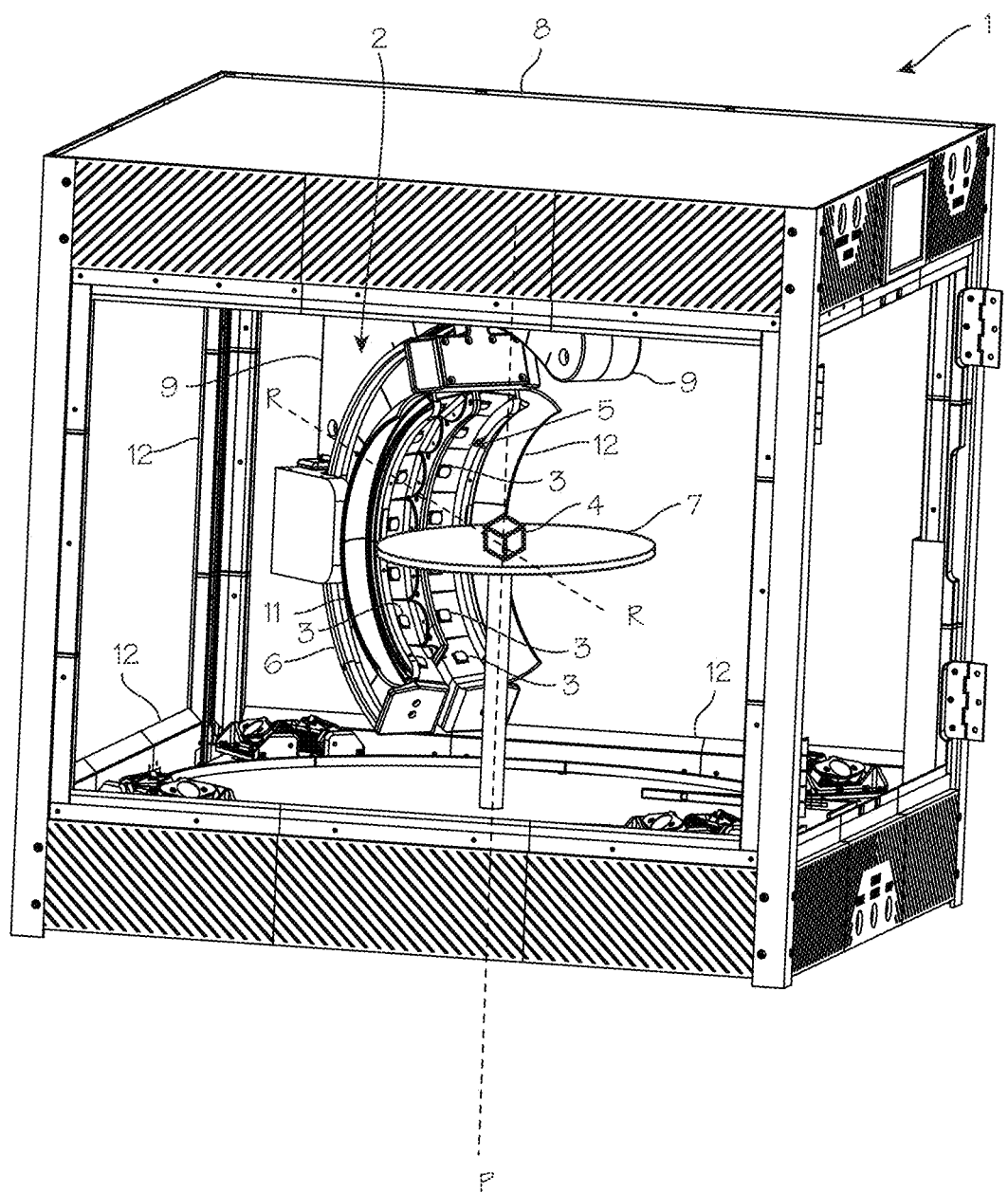
FIG. 1 illustrates a 3D imaging system with a camera rig for obtaining numerous images (photographs or video frames) of a subject object placed on a support within view of numerous cameras fixed on the rig.
Figure 5:
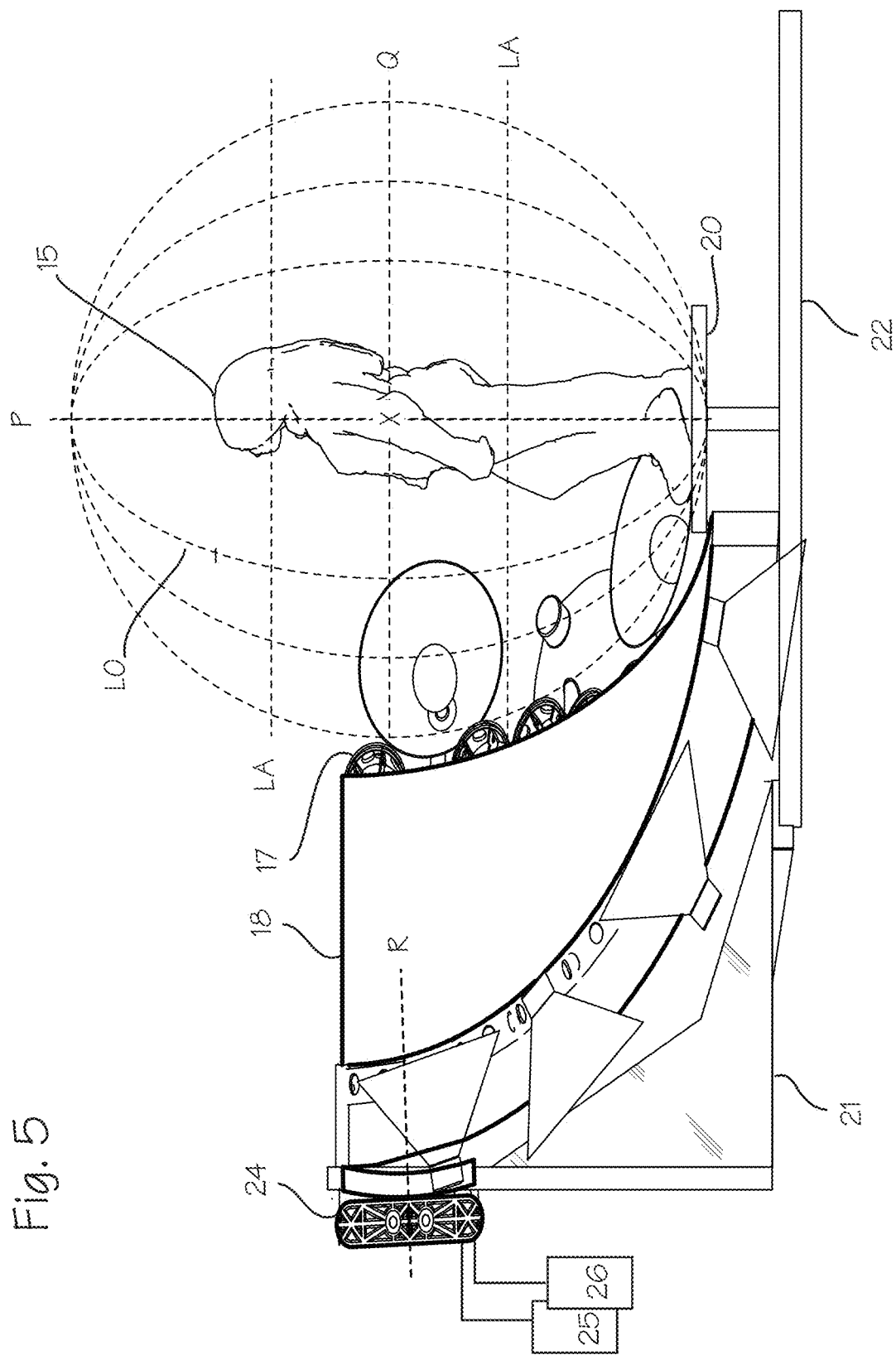
FIG. 5 shows a side view of the system of FIGS. 3 and 4.

FIG. 1 illustrates a 3D imaging system 1 with a camera rig for obtaining numerous images (photographs or video frames) of a subject object placed on a support within view of numerous cameras fixed on the rig. The rig comprises a camera support structure which holds the multiple cameras of an array of cameras in an arrangement conforming to a section of a spherical surface. The camera rig 2 supports an array of cameras 3 in an arcuate arrangement conforming to a surface of a sphere or spheroid, with the cameras directed toward an object 4 to be photographed or videographed for reconstruction of a 3D image. An array 5 of cameras 3 is supported on a camera support structure 6, which holds the array of cameras in an arrangement conforming to a circular arc or similar arcuate arrangement. The object may be disposed on the pedestal 7. The pedestal is preferably fixed to the rig, at a predetermined distance from the rig, and may be rotatable about the axis P of the pedestal and hold the object proximate the axis P. The pedestal may be a plinth or disk, as shown, or a slender rod fitted to the object (such as a camera mount, for example). As illustrated, rig is conveniently supported within a camera box 8. The camera box may include interior side walls (white) so that the box may function as a light box and diffuse lighting from various light sources. The rig is supported on an inner surface of the box (as shown, the top panel of a cuboid box) through a camera boom 9. The camera boom is rotatable about a polar axis P, through the operation of a motor in the camera boom or in the camera box 8, to rotate the camera rig around the object, for example to bring it to the position shown in FIG. 2. The camera support structure 6 is translatable relative to the camera boom 9, through the operation of a motor in the camera boom or the camera support structure. In FIG. 1, the camera rig is positioned in an upper hemisphere of an imaging space surrounding the object. The imaging space may be general spherical or spheroid and may be characterized as virtual sphere, for clarity in references to the position of the camera rig, with a polar axis P, and equator Q, and a radial axes (exemplified by axis R) passing across the spherical space through the polar axis P, as well as longitudinal and latitudinal lines comparable to geographical longitudinal and latitudinal lines. The radial axes pass through the polar axis and extend toward the surface of the virtual sphere (FIG. 5 provides an additional illustration of the image space).

Figure 2:
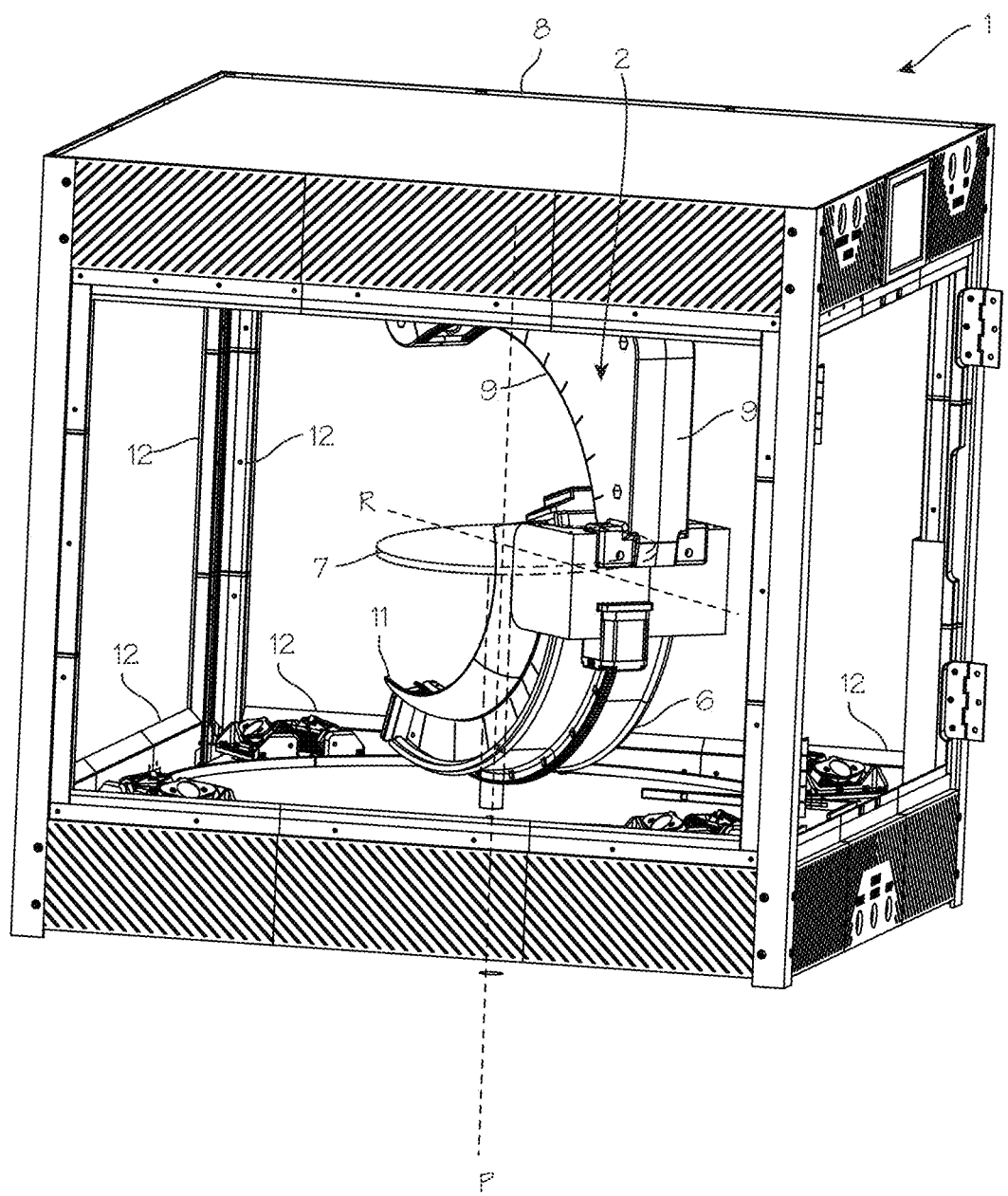
FIG. 2 illustrates the 3D imaging systems with the camera support structure of the camera rig of FIG. 1 in a second position relative to the subject object.

In FIG. 2, the camera rig has been rotated around the axis P (corresponding to a polar axis of the virtual sphere), and has been dropped to the lower hemisphere of the of virtual sphere surrounding the object, having been translated along a longitudinal arc (the camera rig may also be rotated about a radial axis R passing through the lower end of the camera rig. (The rig may instead be rotated about the polar axis to move around the object while remaining with the "upper"

end of the rig in one polar hemisphere defined by the axis P (akin to a southern hemisphere and a northern hemisphere, or hemispheres on opposite ends of the axis of rotation P) and then rotated about a radial axis R to bring the ring into the other polar hemisphere with the "upper" end now in the southern hemisphere, and thereafter rotated about the polar axis to move around the object while remaining with the "upper" end of the rig in the second hemisphere (in the illustration, the lower or southern hemisphere). Rotation and translation to different viewpoints may be accomplished in any order.)

Lighting in the system of FIGS. 1 and 2 may be provided with diffuser covered arcuate lighting panels 11 on the camera support structure 6, and with diffuser covered lighting panels 12. The lighting is controlled to provide lighting on the surface of the object without directing light from the lighting assemblies directly into the field of view of the cameras. Thus, lighting panels 11 may be energized to illuminate the object whenever the cameras are operated to obtain images. Lighting panels behind the camera support structure (panels 12) in FIG. 1 may be energized when the camera support structure is directed as shown in FIG. 1. The same lighting panels are deenergized when the camera support structure is positioned as shown in FIG. 2.

The pedestal is disposed along axis P such that an object disposed on the pedestal is in the field of view of cameras in both hemispheres, such that cameras at the ends of the camera support structure may be positioned at viewpoints from which the top and bottom of the object may be imaged.

FIG. 3 illustrates a 3D imaging system 13 with a camera rig 14 for obtaining numerous images (photographs or video frames) of a subject object placed on a support within view of numerous cameras fixed on the rig. The object may be any object, of any size, and the camera rig and number of cameras on the rig may be sized accordingly. This rig may be free standing, and quite large, to allow for 3D imaging of larger objects (compared to the closed system of FIGS. 1 and 2). The rig comprises a support which holds the multiple cameras of an array of cameras in an arrangement conforming to a section of a spherical or spheroid surface. The configuration of the cameras is, as illustrated, comparable to the surface of a spherical or hemi-spherical ungula (a part of a sphere bounded by two planes intersecting in a diameter and by a line of the surface of the sphere; In solid geometry, an ungula is a region of a solid of revolution, cut off by a plane oblique to its base; a common instance is the spherical wedge), or, analogously, the outer arcuate surface of an orange segment. This arrangement may be referred to as a hollowed spherical ungula, and, thus, the several cameras of the camera array are arranged in a manner conforming to a hollow spherical ungula. This arrangement is illustrated in FIG. 3, which shows an object 15 (in this case, a figurine) to be photographed to develop a 3D image. An array 16 of cameras 17 are supported on a camera support structure 18, which holds the cameras in an arrangement conforming to an ungula, or a section of a spherical surface. Several light sources 19 may also be disposed on the camera support structure 18. The camera support structure may also be shaped as a hollow spherical ungula, or have an interior surface conforming to an outer surface of an ungula, or other section of a spherical or spheroid surface. The object is disposed on the pedestal 20. The pedestal is preferably fixed to the rig, at a predetermined distance from the camera support structure. The pedestal may be rotationally fixed (or may rotatable about the axis of the pedestal which corresponds to the polar axis P, in a mode of operation described below). The pedestal may be a plinth or disk, as shown, or a slender rod fitted to the object (as a camera mount, for example). As illustrated, the rig includes a camera boom 21 rotatably secured to a base 22. The camera support structure is translatable about an axis R perpendicular to the polar axis P, to bring the cameras to a position shown in FIG. 4. In the FIG. 4, the camera rig is in the same longitudinal position around the axis P, but has been lifted, rotating about the axis R (perpendicular to axis P). The rig may be rotated about the polar axis P to move around the object while remaining with the apex 23 of the rig in one polar hemisphere defined by the axis P (akin to a southern hemisphere and a northern hemisphere) and then rotated about a radial axis R (see FIG. 5) to bring the ring into the other polar hemisphere, and thereafter rotated about the polar axis to move around the object while remaining with the apex of the rig in the second hemisphere (in the illustration, the upper or northern hemisphere). The rig may also be translated between the first polar hemisphere to the second polar hemisphere (along a longitudinal arc of the rig) to collect images covering the entire surface of the object, excepting portions that might be blocked by the pedestal (which might be quite slender). Rotation and translation to different viewpoints may be accomplished in any order. Motors configured to rotate the camera boom (and the camera support structure) about the polar axis P may be disposed in the base 22. The power head (motorized camera head) 24 is configured to translate the camera support structure to the second hemisphere. In the embodiment of FIG. 5, the power head is operable to rotate the camera support structure about an axis X (which may coincide with a radius of the imaging space) to rotate camera support structure into the second hemisphere of the imaging space. (As with the embodiment of FIGS. 1 and 2, the power head can be configured to translate the camera support structure along a longitudinal arc to raise it to the second hemisphere of the image space (after rotation about a different axis Y).

The rig is intended to hold the cameras in an arrangement in which the numerous cameras are held at predetermined locations, at predetermined distance (s) from (1) a predetermine location (a point X on the axis P) associated with an object to be imaged.

The camera support structure is rotatable about an axis passing through the pedestal, which preferably is an axis of the sphere defining the ungula surface to which the camera array conforms. In this illustration, the ungula surface is that of a hemisphere. The axis P may be deemed a polar axis, which in use will generally be a vertical axis. Each camera of the array is aimed at the object, and disposed on the camera support structure such all the cameras on the camera support structure have substantially equal lighting and focal length capabilities regardless of the orientation of the rig in space.

To obtain a 3D image of the object, each camera mounted on the camera support structure is operated to obtain a set of images of the object, with each camera obtaining an image from a different angle. The camera support structure is then rotated about the axis P to a second position, and each camera mounted on the camera support structure is again operated to obtain a second set of images of the object, again with each camera obtaining an image from a different angle. This is repeated until images are obtained around the entire lower hemisphere of the imaging space. To obtain a corresponding set of images from an upper hemisphere of angles, the camera support structure is repositioned, such that the base is below the apex, as shown in FIG. 4, (rotated about the equator Q or baseline B (the base of the triangular shape of the array or camera support structure, opposite the apex)

of the array, or rotated about a point on the midline X (along the longitudinal line LO of the array and translated along a longitudinal line) and the camera support structure is rotated about the axis P, such that the camera support structure spans a different hollow ungula region of the upper hemisphere of an imaging space, and the cameras operated as described in relation to FIG. 3. To obtain images covering 360° around the object, covering an entire upper hemisphere of images, the steps of rotation about the polar axis P are repeated until sets of images are obtained covering a desired scope of coverage (typically 360°) around the object, covering an entire upper hemisphere defined by circumscription of the object by rotation of the camera boom and camera support structure. This describes capturing images first around the entire lower hemisphere, and then capturing images around the entire upper hemisphere. The system may instead by operated to capture a first hemisphere set of images along a first longitudinal line, then translating the camera support structure to the second hemisphere to capture a second hemisphere set of images along the first longitudinal line, and so on, to capture images around the entirety of the object, or moving the camera support structure from longitudinal position to longitudinal position, and from hemisphere to hemisphere, in any order.

The system is controlled by a control system 25, which is operable to control the cameras, lighting and image processing system 26 necessary to obtain images, and stitch the many images into a three dimensional representation of the object. The control system may also be configured to operate a display screen or other output device to present the 3D representations of the object to a viewer. In particular, the control system is operable to operate the motors in the camera assembly and/or camera support structure, to rotated the rig about a hemisphere, and to translate the rig from one hemisphere to the other, and also to operate the cameras in the rig to obtain images of the object at each position of the rig, and transfer images to an image processing system along with identifying information for each image (for example, the physical location of the camera operated to obtain the image, or an identification of the camera operated to obtain the image. Additional camera settings and information may be adjusted by the control system and communicated to the image processing system.

The image processing system is operable to receive the images from the cameras and corresponding position information (which may be actual xyz or polar coordinates, or camera identification to be matched with stored coordinate information in the imaging system). The position of each camera may be determined through control of the motors used to rotate the boom and camera support structure, and/or with encoders fixed to rotating components of the system, such as the camera boom of the previous figures and the power head shown in FIG. 5, along with fixed position of each camera on its camera support structure. The position of each camera may be stored in the imaging processing system or memory accessible to the image processing system (in the control system, or electronics associated with each camera, and transmitted in metadata of each image). Using image stitching techniques, the image processing system reconstructs a 3D model of the object. Standard three-dimensional reconstruction techniques may be used and may be facilitated by identifying the location of each image, identifying the shared edges of adjacent images, and thereafter applying image stitching techniques to the shared edges of adjacent images. This process speeds the reconstruction of the 3D model because the image processing system does not need to compare numerous images to find matching images before stitching.

3D rendering software can be used to process the many images obtained, along with information including background images, camera position, camera parameters such as zoom and focal length, and details of the object, and overlay matching pixels and features from one photo with another, stitching together each image until all images are combined to form a complete 360° representation of the object.

The system also includes an array of lights 19, disposed about the periphery of the camera support structure, directed toward the object and, optionally, directed away from the object, to provide even illumination for the object. The camera boom and camera support structure may be disposed within a light box to promote even illumination of the object.

FIG. 5 shows a side view of the system of FIGS. 3 and 4, showing camera rig 2 including several of the cameras 17 and light sources, the camera support structure 18, the camera boom 21, supported on the base 22. The side view shows the junction between the power head and the camera support structure, which is operable to rotate the camera support structure about a Point P, which is preferably located along a central longitudinal line bisecting the camera support structure (that is, in the center of a latitudinal arc spanning the camera support structure from side to side) and displaced from the baseline B. Locating the rotation point displaced from the base is preferred because, upon rotation from one hemisphere to the other, at least some cameras of the array (the row disposed along the baseline B, above the axis R in the illustration) which obtain images from a one area of the object (near the center of the object) in the first hemisphere are directed to the same area of the object.

FIGS. 6 and 7 provide additional views of the camera support structure of FIGS. 3 and 4 to illustrate characteristics which facilitate imaging. Additional characterization of the camera support structure include the base arc 28 and the apex 29. The base arc, or the longest arc between any camera on the camera support structure and a light source disposed proximate or on the base arc, may be limited to ensure that no (operable) camera is disposed with an viewing axis aimed at a light. A separation angle α (alpha) of about 68-72 degrees between a camera viewing axis and the light source furthest away on the rig will provide adequate separation between cameras and lighting along a latitudinal arc to ensure that a camera and light on either end of the base will not be aimed at each other, and the lighting axis (main axis of the light emanating from the lights) and the camera viewing axis (the main axis of imaging field of view) are not coincident, and the field of illumination of a light on one side of the rig does not overlap the field of view of a camera on the other side of the rig. (Depending on the design criteria, the camera support structure would not need to cover 90 degrees, but could be configures to cover smaller angles, as shown, and rotated about the polar axis in sufficient steps to cover the entire circumference of the object. The separation angle alpha can be narrowed or broadened depending on the field of view of the cameras and the field of illumination of the light sources). As shown in FIG. 7, along a longitude line LO, the angle of separation β (beta), between a portion of the camera's in the array near the base arc and camera (s) near the apex of the array preferably exceeds 90°, such that a field of view of a camera near the apex encompasses an end the object in a first hemisphere of the imaging space while the field of view of some camera's near the base arc will encompass an area of the object in the second hemisphere (the opposite side of the equator Q), and, upon rotation of the camera support structure (about axis R in FIG. 5, for example), the field of view of a camera near the apex encompasses the opposite end the object in the second hemisphere while the field of view of the camera's near the base arc will encompass an area of the object in the first hemisphere (the opposite side of the equator Q).

The system has been illustrated with arcuate camera arrays, with camera substantially equidistant from the object, center of the object or imaging space (for example, the point X on the axis P), or the polar axis of the imaging space) (that is, the focal point), operating the cameras with substantially the same focal lengths and other parameters. A similar effect can be obtained using straight or rectilinear arrays of cameras, with each camera located at a different distance from the focal point directed toward the desired focal point, but with the focal length adjusted such that the focal distance of each camera matches the distance to the focal point. Also, though each system has been described with a camera boom configured to rotate the camera support structure about the polar axis of the imaging space, the system can be operated by maintaining the camera support structure in a single polar hemisphere of the imaging space, rotating the pedestal to rotate the object, and sequentially operating the cameras in the single polar hemisphere as the object is rotated to obtain images of the entire circumference of the first portion of the object, and also operated to obtain images of the entire circumference of the second portion of the object by translating the camera support structure to the second polar hemisphere and again maintaining the camera support structure in a second polar hemisphere of the imaging space, rotating the object and/or the pedestal, and sequentially operating the cameras in the second polar hemisphere as the object is rotated, without rotating the camera support system about the polar axis of the imaging space (holding the camera support system in a single longitudinal position). For this configuration, in the systems of FIG. 1 or FIG. 3, the camera boom may be configured to hold the camera support system fixed about the polar axis, yet still be configured to translate the camera support system from a first polar hemisphere to a second polar hemisphere. The rotational position of the pedestal (and thus the object) may be determined with appropriate encoders or through control of the motor used to rotate the pedestal, and the location of each camera may be calculated from the measured or controlled rotational position of the pedestal and the position of the camera on the camera support system.

To facilitate stitching, the system may include a dynamic virtual background behind the object, on a turntable that rotates in tandem with the camera rig.

Also to facilitate stitching, additional lighting, outside the visible wavelength detectable by the cameras (such as infrared light), may be projected onto the object as reference points on the object. By placing an array of different wavelengths of laser lights within the infrared spectrum (780 nm to 1 mm) onto the subject object, the camera and software can identify features of overlay that would not appear in the visible image. This array could be viewed as dozens of IR dots with specific orientation displayed on the object. Individual cameras may detect slightly different wavelengths of infrared index images projected by the lasers. The cameras of the array can take two successive photos per position, one to capture orientation based on the light array in the IR spectrum, and one regular photograph in the visible spectrum (or a system processing the images could be programmed to process infrared data detectable by the cameras, and build the three dimensional images without the infrared information).

In use, the systems described above may be operated by placing an object to be imaged in the imaging space, starting with the camera support structure in a first position, and using the control system 25 to operate the cameras and lighting and control the camera boom and camera support structure to (1) operate the plurality of cameras on the camera support structure to obtain a first set of images of the object from a first viewpoint, (2) rotate the camera support structure along an arcuate path around an axis of the imaging space and operate the plurality of cameras on the camera support structure to obtain a second set of images of the object from a second viewpoint, and so on, to obtain images of the object from multiple viewpoints in the first hemisphere of the imaging space; and (3) control the camera boom to translate the camera support structure to position the camera support structure in a second hemisphere of the imaging space and operate the plurality of cameras on the camera support structure to obtain a first set of images of the object from a first viewpoint in the second hemisphere and rotate the camera support structure along an arcuate path and around the axis of the imaging space and operate the plurality of cameras on the camera support structure to obtain a second set of images of the object from a second viewpoint in the second hemisphere, and so on, to obtain images of the object from multiple viewpoints in the second hemisphere. The image processing system may be operated to receive the images from the plurality of cameras and process the images obtained from the plurality of cameras, and reconstruct a 3D model of the object from the images, which includes operation of the image processing system to stitch the images from the cameras into a 3D reconstruction of the object by matching bordering edges of images obtained from adjacent cameras as determined from location data of the cameras, prior to, or in lieu of, analyzing edges of non-adjacent images.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A system for obtaining images of an object for 3D reconstruction, said system comprising:
    a camera rig comprising a camera support structure disposed on a camera boom, a plurality of cameras disposed on a camera support structure, said plurality of cameras disposed in an arcuate array on the camera support structure;
    said camera boom configured to hold the camera support system in a first longitudinal position of an imaging space surrounding the object, in a first hemisphere of the imaging space surrounding the object; said camera support structure translatable on the camera boom to position the camera support structure in a second hemisphere of the imaging space while maintaining the camera support system in the first longitudinal position;
    a pedestal configured to hold the object proximate the polar axis of the imaging space, said pedestal configured to rotate the object about the polar axis
    a control system operable control the camera boom and camera support structure to (1) operate the plurality of cameras on the camera support structure to obtain a first set of images of the object from a first viewpoint, (2) rotate the pedestal about the polar axis of the imaging space and operate the plurality of cameras on the camera support structure to obtain a second set of images of the object from a second viewpoint, and so on, to obtain images of the object from multiple viewpoints about the circumference of the object; and (3) control the camera boom to translate the camera support structure to position the camera support structure in a second hemisphere of the imaging space and operate the plurality of cameras on the camera support structure to obtain a first set of images of the object from a first viewpoint in the second hemisphere and (4) rotate the pedestal about the polar axis of the imaging space and operate the plurality of cameras on the camera support structure to obtain a second set of images of the object from a second viewpoint in the second hemisphere, and so on, to obtain images of the object from multiple viewpoints in the second hemisphere; and an image processing system operable to receive the images from the plurality of cameras and process the images obtained from the plurality of cameras, and reconstruct a 3D model of the object from the images.

* * * * *